United States Patent
Kuhnle et al.

(10) Patent No.: US 8,630,926 B1
(45) Date of Patent: *Jan. 14, 2014

(54) SYSTEM, METHOD, AND PROGRAM PRODUCT FOR UNIT TRANSFER FEE PROCESSING

(75) Inventors: Paul Edward Kuhnle, Doylestown, PA (US); George Tedesche Simon, Evanston, PA (US); John Stuart Thomas, Bernardsville, NJ (US); Mark Steven Criscitello, Colts Neck, NJ (US); Daniel Joseph McCabe, Upper Saddle River, NJ (US)

(73) Assignee: D12 Ventures, LLC, Bedminster, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,158

(22) Filed: Mar. 28, 2012

Related U.S. Application Data (63) Continuation-in-part of application No. 13/311,268, filed on Dec. 5, 2011.

(51) Int. Cl.
*G07B 17/00* (2006.01)

(52) U.S. Cl.
USPC .......... 705/30; 705/38; 705/39; 705/40; 705/35; 705/4; 705/57; 705/17; 705/41; 705/37; 705/18; 705/32; 705/44; 705/50; 235/379; 235/380

(58) Field of Classification Search
USPC .................................................. 705/30
See application file for complete search history.

(56) References Cited

U.S. PATENT DOCUMENTS

| | | | |
|---|---|---|---|
| 7,310,616 B2 | 12/2007 | Sugahara | |
| 2003/0225619 A1 | 12/2003 | Dokken et al. | |
| 2004/0128262 A1 | 7/2004 | Nafousi | |
| 2008/0091626 A1 | 4/2008 | Kremen | |
| 2008/0313068 A1 | 12/2008 | Sun | |
| 2010/0004999 A1 | 1/2010 | Depetris et al. | |
| 2010/0005030 A1 | 1/2010 | Depetris et al. | |
| 2010/0191587 A1* | 7/2010 | Duerr | 705/14.7 |

OTHER PUBLICATIONS

Unknown. Competition and Regulation in Retail Banking. OECD Journal of Competition Law and Policy 11.3 (Jun 22, 2011): 101,103-107,109-165.*
Office Action dated Dec. 10, 2012 issued in connection with U.S. Appl. No. 13/311,268.
Gerdeman, Aaron J., "Security Lending Market Trends," Sungard Astec Analytics, Sep. 2009, pp. 1-4.

(Continued)

*Primary Examiner* — Ryan Zeender
*Assistant Examiner* — Fawaad Haider
(74) *Attorney, Agent, or Firm* — Foley & Lardner LLP (57) ABSTRACT

A method, system and program product, the method comprising: accessing Transfer Fee data to be paid to a third party that is not the borrower or the lender or the buyer or seller in a repurchase agreement transaction of a security for a right to loan or repo one or more units of the security; accessing data on a loan or repo of units of the security, calculating an amount of a Transfer Fee for the right to loan or repo the security; generating data for debiting an account or sending a bill for the Transfer Fee; and updating the database with data on the Transfer Fee.

26 Claims, 4 Drawing Sheets

(56) References Cited

OTHER PUBLICATIONS

Hintze, John, "Automation Has Greater Impact as Securities Lending Increases," Securities Industry News, May 6, 2006, 2 pages.
Office Action dated Mar. 26, 2013 issued in connection with U.S. Appl. No. 13/311,268.
Anonymous, Competition and Regulation in Retail Banking, OECD Journal of Competition Law and Policy 11.3, pp. 101, 103-107, 109-165, Jun. 22, 2011.
Notice of Allowance dated Jul. 17, 2013 issued in connection with U.S. Appl. No. 13/311,268.

* cited by examiner

SYSTEM, METHOD, AND PROGRAM PRODUCT FOR UNIT TRANSFER FEE PROCESSING

This application is a Continuation-in-Part of application Ser. No. 13/311,268, filed Dec. 5, 2011, which is hereby incorporated by reference in its entirety for all purposes.

The present invention relates to transfer fees for security loans and repurchase agreement sales.

FIELD OF THE INVENTION

1. Background

The total US equity market capitalization is 15.3 trillion dollars represented in approximately 300 billion shares of securities, the US Debt Market is comprised of 35 trillion dollars represented by 350 billion securities. The stock, bond and fund loan market is a dealer market. No statistics are published on this market, but industry estimates suggest that at least half of the securities in the market are available for loan or a repurchase transaction at any one time.

2. Summary

Embodiments of a method are disclosed, comprising: accessing, using one or more computers, Transfer Fee data held in one or more databases on a required Transfer Fee to be paid to a third party that is not a borrower or a lender or a repurchase seller or repurchase buyer of a security for a right to loan or to sell in a repurchase agreement transaction one or more units of the security; accessing, using the one or more computers, data on a loan, or a sale in a repurchase agreement transaction, of one or more units of the security, the data comprising the number of the units of the security and/or value data for the securities loaned or sold in the repurchase agreement transaction and/or the fact of the loan or repurchase agreement transaction, and an identification of one or more of a lender or a borrower or a repurchase agreement seller or a repurchase agreement buyer of the security; correlating, using the one or more computers, the data for the loan or the sale in a repurchase agreement transaction of the security with the Transfer Fee data for the right to loan or sell in a repurchase agreement transaction the security; calculating or having calculated and/or determining or having determined an amount of a Transfer Fee for the right to loan or sell in a repurchase agreement transaction the number of units or value of the security based at least in part on the Transfer Fee data for the respective security; debiting or having debited and/or generating data for debiting at least one account and/or generating or having generated and/or sending or having sent at least one bill, using the one or more computers, for the amount of the Transfer Fee to be paid to the third party that is not the borrower or the lender or the repurchase agreement seller or the repurchase agreement buyer of the security for a right to loan, or sell in a repurchase agreement transaction, the number of units or value of the security, based at least in part on the calculating and/or determining step; and updating or providing data for an updating, using the one or more computers, the one or more databases with the amount of the Transfer Fee determined and/or calculated and/or debited and/or billed and/or an amount of the Transfer Fee received by the third party that is not the borrower or the lender or the repurchase agreement seller or the repurchase agreement buyer of the security for the loan, or sale in a repurchase agreement transaction, of the number of units or value of the security.

Embodiments of a system are disclosed, comprising: one or more computers, configured to be capable of performing the following steps: accessing, using one or more computers, Transfer Fee data held in one or more databases on a required Transfer Fee to be paid to a third party that is not a borrower or a lender or a repurchase seller or repurchase buyer of a security for a right to loan or to sell in a repurchase agreement transaction one or more units of the security; accessing, using the one or more computers, data on a loan, or a sale in a repurchase agreement transaction, of one or more units of the security, the data comprising the number of the units of the security and/or value data for the securities loaned or sold in the repurchase agreement transaction and/or the fact of the loan or repurchase agreement transaction, and an identification of one or more of a lender or a borrower or a repurchase agreement seller or a repurchase agreement buyer of the security; correlating, using the one or more computers, the data for the loan or the sale in a repurchase agreement transaction of the security with the Transfer Fee data for the right to loan or sell in a repurchase agreement transaction the security; calculating or having calculated and/or determining or having determined an amount of a Transfer Fee for the right to loan or sell in a repurchase agreement transaction the number of units or value of the security based at least in part on the Transfer Fee data for the respective security; debiting or having debited and/or generating data for debiting at least one account and/or generating or having generated and/or sending or having sent at least one bill, using the one or more computers, for the amount of the Transfer Fee to be paid to the third party that is not the borrower or the lender or the repurchase agreement seller or the repurchase agreement buyer of the security for a right to loan, or sell in a repurchase agreement transaction, the number of units or value of the security, based at least in part on the calculating and/or determining step; and updating or providing data for an updating, using the one or more computers, the one or more databases with the amount of the Transfer Fee determined and/or calculated and/or debited and/or billed and/or an amount of the Transfer Fee received by the third party that is not the borrower or the lender or the repurchase agreement seller or the repurchase agreement buyer of the security for the loan, or sale in a repurchase agreement transaction, of the number of units or value of the security.

In embodiments, the method and system may further comprise an operation of sending or having sent or generating or having generated or making accessible electronically, data on revenue from one or more of the Transfer Fees to be paid to an issuer of the security if the security is issued by a collective investment vehicle or other entity where the Transfer Fee may be accrued or is to be accrued.

In embodiments, the Transfer Fee may be based at least in part on a fee algorithm comprising an amount per time period, and the sending or having sent or generating or having generated data step further comprises accruing the amount of the Transfer Fee for the right to loan or sell in a repurchase agreement transaction the number of units of the security of the collective investment vehicle as the time periods for the loan or repurchase agreement sale of the security elapse; and further comprising updating or having updated, using the one or more computers, the one or more databases periodically or on an ad hoc basis to obtain a current accrued amount of the Transfer Fee for use in calculating the net asset value (NAV) for the collective investment vehicle.

In embodiments, the one or more databases may contain data for a prospectus for the security and/or a contract relating to the security, with the data for the prospectus and/or the contract including a fee algorithm or a reference to a fee algorithm for calculating the Transfer Fee.

In embodiments, the one or more databases may contain a contract comprising a trust agreement for the security.

In embodiments, the Transfer Fee may be cash.

In embodiments, the security may be an exchange traded fund unit.

In embodiments, the security may be a bond.

In embodiments, the security may be a common stock.

In embodiments, the security may be a closed end collective investment vehicle unit.

In embodiments, the Transfer Fee may comprise a fee to be calculated at least in part using a fee algorithm selected from the group of a fixed fee, a fee/per time period, a fee that varies at least in part with the length of the lending or repurchase agreement period, a fee that varies at least in part on the number of units of the security loaned or sold in the repurchase agreement transaction, a fee that varies at least in part based on a price of a unit of the security, and a fee based on two dimensional tiering using the number of units loaned or sold in the repurchase agreement transaction as one tier parameter.

In embodiments, the updating step may be performed on a substantially real time basis as data is received on the loan or sale in the repurchase agreement transaction of securities.

In embodiments, the debiting may be of an account associated directly or indirectly with the lender of the securities, or associated directly or indirectly with the seller of the securities in a repurchase agreement transaction, based at least in part on the calculating and/or determining step.

In embodiments, the account is held by the lender, or the seller in a repurchase agreement transaction, in a universal clearing service for the security.

In embodiments, the method and system may further comprise an operation of generating and sending or having sent a bill, for the amount of the Transfer Fee, based at least in part on the calculating and/or determining step.

In embodiments, the method and system may further comprise an operation of generating data, using the one or more computers, for providing a Web interface for receiving data on a loan or sale in a repurchase agreement transaction of units of the security.

In embodiments, the receiving data operation may comprise receiving notification of a loan, or a sale in a repurchase agreement transaction, of units of the security from a universal clearing service for the security.

In embodiments, the accessing Transfer Fee data operation may comprise an operation of obtaining identification of both the lender of a security and the borrower of the security or identification of both the seller of the security and the buyer of the security in a repurchase agreement transaction.

In embodiments, the calculating and/or determining the amount of the Transfer Fee may comprise an operation of allocating at least a portion of the fee amount, to each of the lender and the borrower, or to each of the repurchase seller of the security and the repurchase buyer of the security in the repurchase agreement transaction.

In embodiments, the method and system may further comprise operations of: aggregating fees, using the one or more computers, paid by the lender and/or the borrower or paid by the repurchase seller of the security and/or the repurchase buyer of the security in a repurchase agreement sale, to determine if there is a full fee payment of the Transfer Fee for the loan or repurchase agreement sale, or whether there is a shortfall; assessing, using the one or more computers, all or a portion of the shortfall in the entire Transfer Fee amount against one selected from the group of the lender and the borrower if the other selected from the group of the lender and borrower has not paid their respective portion of the fee amount, or against one selected from the group of the repurchase seller and the repurchase buyer if the other selected from the group of the repurchase seller and repurchase buyer in a repurchase agreement sale has not paid their respective portion of the fee amount; and debiting an account and or billing to one selected from the group of the lender and the borrower, or to one selected from the group of the repurchase seller and the repurchase buyer in a repurchase agreement sale, an increased amount comprising all or a portion of the shortfall if the other selected from the group of the lender and the borrower for the loan, or the other selected from the group of the repurchase seller and the repurchase buyer in a repurchase agreement sale, has failed to pay their portion of the fees.

In embodiments, the method and system may further comprise an operation of: determining, using the one or more computers, interest and/or a penalty on one or both of the lender or the borrower for a loan, or one or both of the repurchase seller or the repurchase buyer in a repurchase agreement sale for any late payment of the Transfer Fee; and debiting an account or billing to one or both of the lender or the borrower for a loan, or to one or both of the repurchase seller or the repurchase buyer in a repurchase agreement sale, for any late payment of the Transfer Fees.

In embodiments, the accessing Transfer Fee data step may comprise operations of obtaining a registration of a loan of a security from one selected from the group of the lender of the security and the borrower of the security, or obtaining a registration of a sale of a security from one selected from the group of the repurchase seller of the security and the repurchase buyer of the security in a repurchase agreement sale; and the method and system may further comprise: determining, using the one or more computers, if there is matching registration of the loan from the other selected from the group of the lender and the borrower, or if there is matching registration of the repurchase agreement sale from the other selected from the group of the repurchase seller or the repurchase buyer; and entering or having entered, using the one or more computers, data indicating matching registrations for the loan or repurchase agreement sale, or a failure to determine matching registrations for the loan or repurchase agreement sale.

In embodiments, the method and system may further comprise an operation of generating data, using the one or more computers, for an electronic screen display representing a lender-borrower chain, and/or a repurchase seller-repurchase buyer chain for a repurchase agreement sale.

In embodiments, the method and system may further comprise an operation of: writing, using the one or more computers, an amendment to a prospectus in a prospectus database to add language on the required Transfer Fee to be paid to the third party for a right to loan or sell in a repurchase agreement sale one or more units of the security.

In embodiments, the method and system may further comprise an operation of generating and sending or having sent, using the one or more computers, a notification of a lender-borrower chain for the loan of the security, or a notification of a repurchase seller-repurchase buyer chain for a repurchase agreement sale.

In embodiments, the method and system may further comprise an operation of generating and sending or having sent, using the one or more computers, a notification of a dividend, interest or distribution associated with an owner of the security.

In embodiments, the method and system may further comprise an operation of calculating or having calculated, using the one or more computers, a net asset value (NAV) for the collective investment vehicle, using the accrued Transfer Fees as a part of a value of the collective investment vehicle.

DETAILED DESCRIPTION

The present invention comprises a management system, method and program product to allow collective investment vehicles and other security issuers to arrange to be compensated for permitting their securities to be loaned or to be sold pursuant to a repurchase agreement (a "repo sale"). In embodiments, such borrowed securities repo'd securities may be used to settle short sale transactions. In embodiments, the operations described herein may apply to exchange traded funds (ETF's), closed end funds, and any security where the compensation to the issuer may be accrued periodically, e.g., daily, to aid in pricing of the security or options, swaps and other derivatives based on the security.

A repurchase agreement, also known as a repo, RP, or sale and repurchase agreement, is the sale of securities together with an agreement for the seller to buy back the securities at a later date. The repurchase price may in embodiments be greater than the original sale price, the difference effectively representing interest, sometimes called the repo rate. The party that originally buys the securities effectively acts as a lender. The original seller is effectively acting as a borrower of the amount of the purchase price, using their security as collateral for a secured cash loan of the amount of the purchase price at a fixed rate of interest. Economically, a repo is the equivalent of a securities loan.

In order to settle a short sale transaction, the short seller must borrow securities to deliver to the buyer. In such a securities loan, an agreement is created between the lender and borrower specifying the rights and obligations of both parties. The lender is typically given cash collateral securing the borrower's obligation to return the borrowed securities on demand. The lender may invest the cash and retain all or a portion of the income as negotiated between the lender and the borrower. The borrower may also be required to pay additional sums to the lender if the yield on the investment is not sufficient to offset the loan fees. The securities loan agreement permits the borrower to treat the borrowed securities as if it owned them outright, including a right to sell them or re-lend them, subject to its obligation to return the securities based on the agreement. During the course of the securities loan, the borrower is obligated to compensate the lender for any dividends, interest, or other distributions to which the lender would be entitled. Because the borrower can re-lend or sell the securities, because both the lender and the person buying the borrowed securities from the borrower, are economically "long" the security, the securities loan has doubled the notional exposure of the securities. In the case of ETFs, the borrower can even redeem the borrowed units, leaving more notional value outstanding than the number of units issued by the collective investment vehicle. Accordingly, as security loan transactions may be serialized, short interest in a collective investment vehicle may actually exceed the number of issued units of the collective investment vehicle. Further, in the case of an ETF, the expenses of the collective investment vehicle are borne by a smaller number of unit holders than the number of persons having a notional interest in the performance of the collective investment vehicle. In essence, it is recognized herein that the securities loan deprives the collective investment vehicle of additional income which could be used to the benefit of all actual holders. The present technology will allow the collective investment vehicle to capture these lost fees. A similar analysis applies for sales pursuant to a repurchase agreement transaction which is considered to be an equivalent.

Embodiments of the present method, system and program product seek to enable a collective investment vehicle or security issuer to capture fees ("Transfer Fee") by requiring the lender or borrower or both of the security or their respective agents or another entity, or the seller or the buyer of the security or both in a repurchase agreement, to register with an entity that will record each loan or repo'd securities sale in one or more databases. In embodiments, an example data structure for such a registration may comprise one or more of a security identifier, a number of units loaned or to be loaned, or sold or to be sold in a repo transaction, a rate and a term of the loan or repo sale, and an identifier of the lender and/or the borrower or seller and/or borrower of the security. After terms of the loan or repo sale are registered, the collective investment vehicle or its agent in embodiments may debit an account and/or bill either party or both parties for the Transfer Fee. In embodiments, the Transfer Fee may comprise a part or all of a management fee that would have been paid had all of the notional interest been represented by actual issued units.

Figure 1:
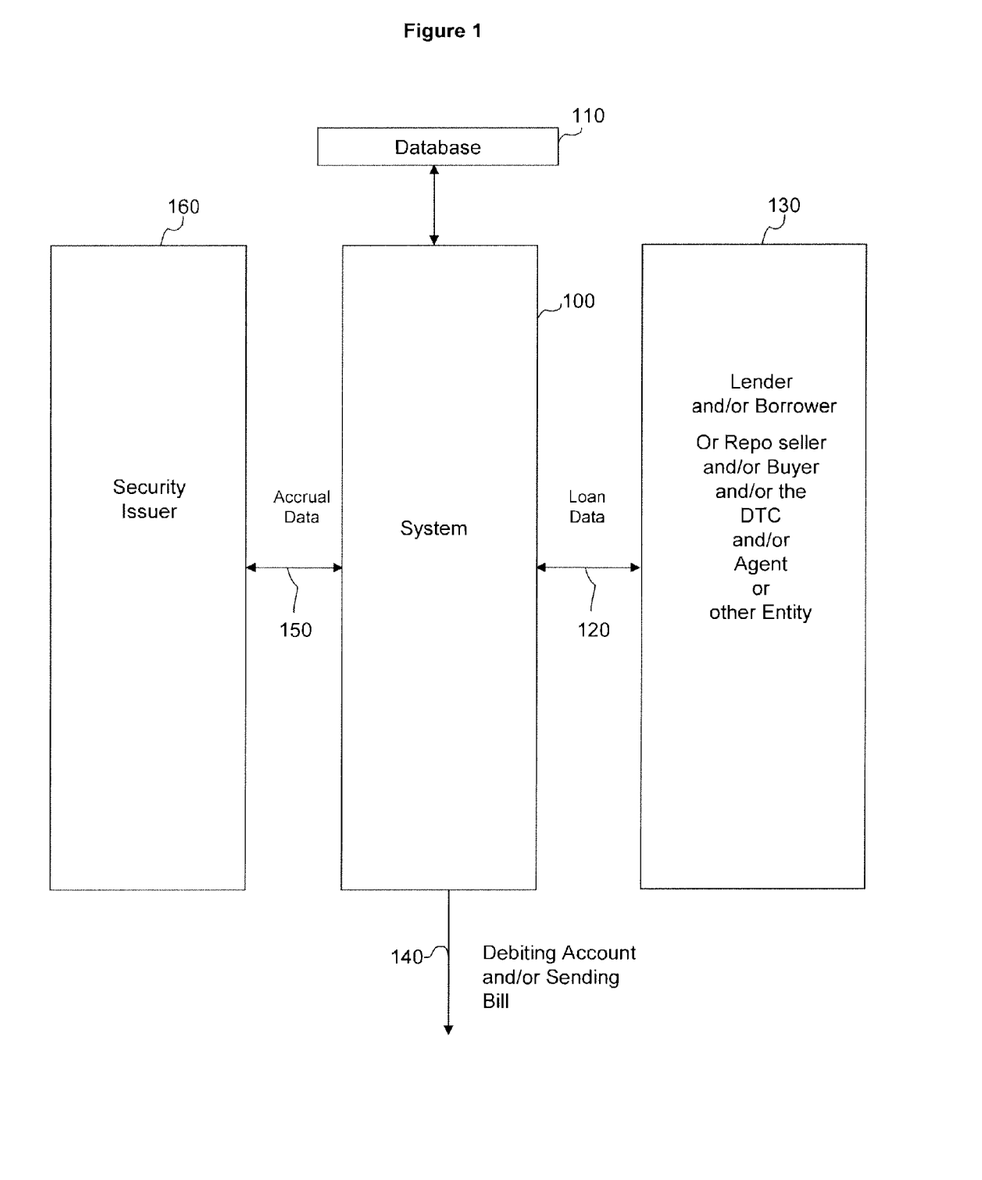
FIG. 1 is a schematic block diagram representing some embodiments of the invention.
Figure 3:
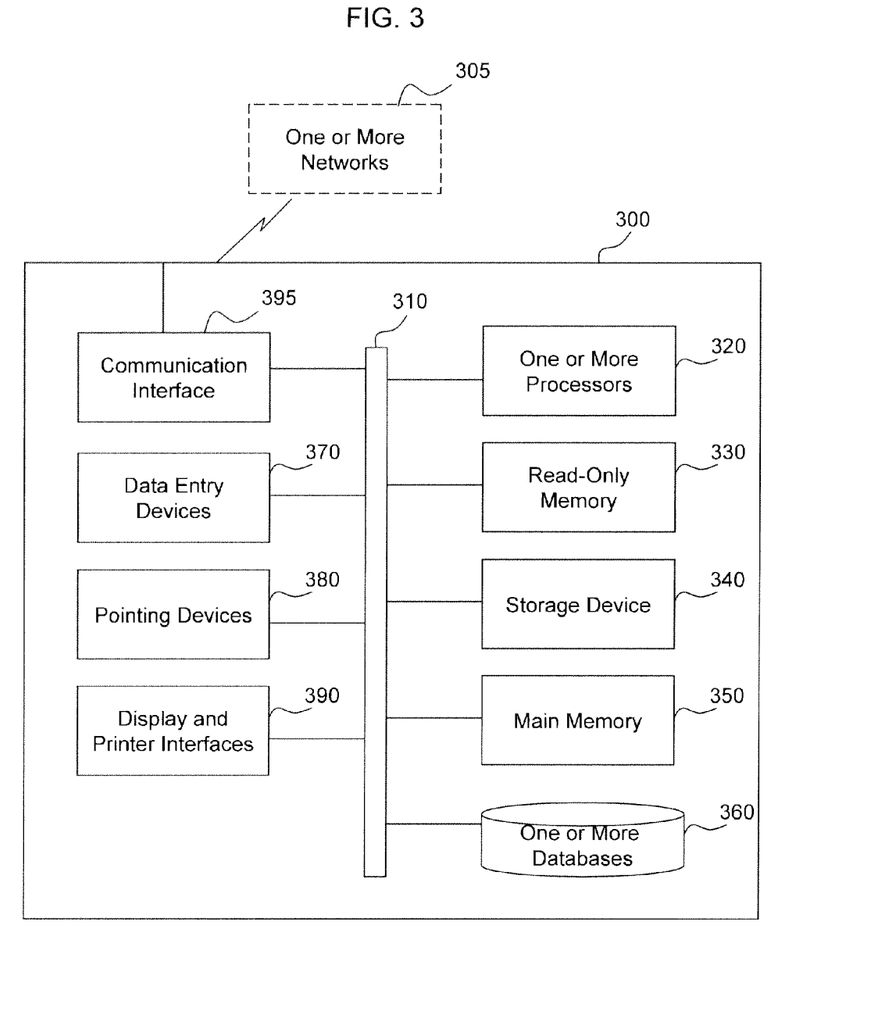
FIG. 3 is a schematic block diagram of a computer configuration for implementing embodiments of the invention.
Figure 4:
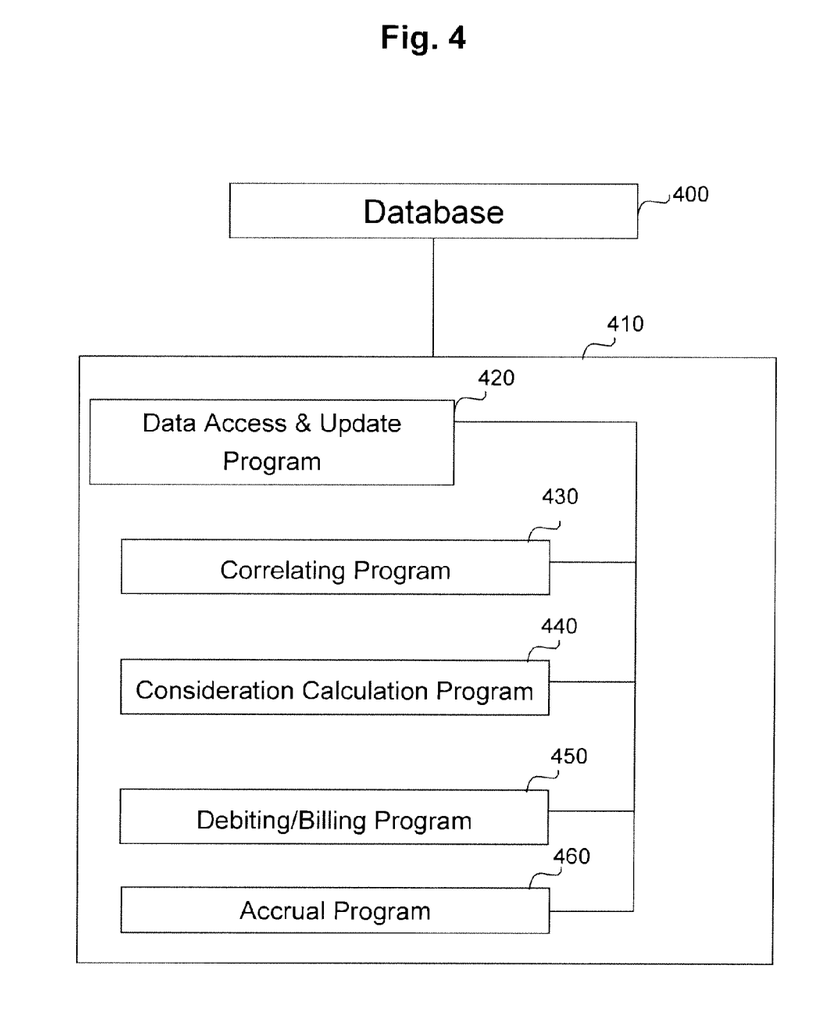
FIG. 4 is a schematic block diagram of a system and program configuration for implementing embodiments of the invention.

In embodiments, the various transactions and transfers to be described herein, may take place using the systems and components shown in FIGS. 1, 3 and 4, although one of skill in the art will appreciate that many variations of the system may be implemented without departing from the scope of the invention. In embodiments, suitable networking protocols may be used, including the Transport Control Protocol/Internet Protocol (TCP/IP) suite of protocols, and also including the HyperText Transport Protocol (HTTP) and associated security protocols HTTPS, and other mechanisms such as Virtual Private Networking (VPN), Secure Sockets Layer (SSL), Transport Layer Security (TLS), tunneling protocols such as Generic Routing and Encapsulation (GRE), Layer 2 Tunneling Protocol (L2TP), and the like. Another protocol that may be used to facilitate the transactions and associated messaging described herein is the Financial Information exchange (FIX) Protocol, which is a messaging standard developed specifically for the real-time electronic exchange of securities transactions. FIX is a public-domain specification owned and maintained by FIX Protocol, Ltd. In addition, some of the transactions may be communicated in a manual fashion, such as via telephone or textual messaging (email, and the like), whereupon the relevant transaction information may be keyed, scanned or otherwise entered into the appropriate computer systems.

Referring to FIG. 1, embodiments are illustrated of data communications that may be generated. Element 100 comprises an embodiment of a system consistent with the invention. The system 100 operably communicates with one or more electronic databases 110. As noted above, there may be a single database with loan and/or repurchase agreement registration information data structures, security fee obligation data, and billing data, or there may be multiple databases, which may, in embodiments be distributed. In embodiments, one or more of these databases may be maintained by a universal clearing entity, such as the Depository Trust & Clearing Corporation (DTCC).

Loan data or repo data 120 may be obtained from one or more entities, represented by block 130, which may comprise a lender, and/or a borrower, and/or an agent thereof, or a repo seller and/or a repo buyer, and/or an agent thereof, and/or a universal clearing entity, or other entity. Note that this data may be obtained via an electronic computer-to-computer communication, and/or orally, and/or by facsimile, and/or by mail, and then keyed and/or scanned into the one or more databases.

Operations debiting one or more accounts and/or billing for the Transfer Fee is represented by the line 140. Where the security issuer accrues fees as income for the security, an accrual operation 150 with respect to a security issuer 160 or their designee is represented.

Figure 2:
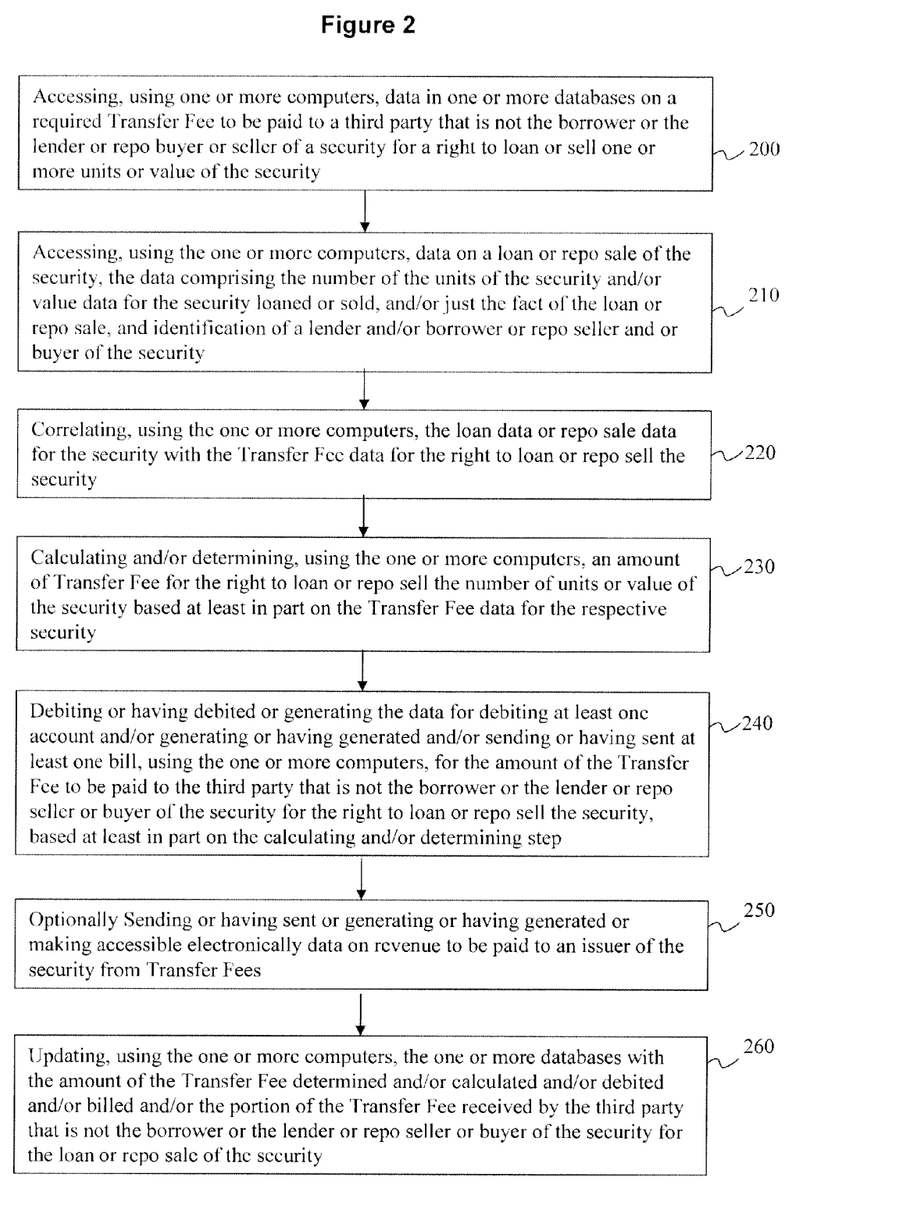
FIG. 2 is a flowchart for implementing embodiments of the invention.

Embodiments of a method of operation are represented in FIG. 2. Block 200 represents an operation of accessing, using one or more computers, Transfer Fee data in one or more databases on required Transfer Fees to be paid to a third party that is not the borrower or the lender of a security for a right to loan or sell in a repurchase agreement transaction one or more units of the security. In embodiments, the third party may be a person, an account, an agent, a designee, a security issuer, to name a few. The only limitation on the third party is that it is not the lender or the borrower or repurchase agreement seller or the repurchase agreement buyer of the security. In embodiments, a step may be performed of entering or having entered in the one or more databases, the data on the required Transfer Fee to be paid to a third party that is not the borrower or the lender or a repurchase agreement seller or the repurchase agreement buyer of a security for a right to loan, or sell in a repurchase agreement transaction, one or more units of the security. Note that in embodiments, the one or more databases may comprise Transfer Fee data for a plurality of securities of a plurality of issuers. In embodiments, the one or more databases may comprise Transfer Fee data for only one Transfer Fee.

The Transfer Fee data may be obtained via an electronic computer to computer communication, and/or orally, and/or by facsimile, and/or by mail, and then keyed and/or scanned into the one or more databases. In embodiments some of the fee payment obligations may be derived and/or extracted from prospectuses. This derivation and/or extraction may be electronic via an electronic search for loan Transfer Fee obligations within a prospectus database, and/or may be manually obtained from a hard copy and keyed into the one or more databases.

In embodiments, registration of a loan or repurchase agreement transaction may be accomplished through means such as:
1) A secure web interface.
2) Phone call to an agent who enters the data via a terminal.
3) A direct computer-to-computer feed via dedicated lines, private packet switched network or the Internet.
4) A faxed form to an agent who enters the data via a terminal.
5) A mailed form to an agent who enters the data via a terminal.
6) A computer feed from a stock loan industry facilitator, e.g., LoanNet, or a repo facilitator.

The Transfer Fee for the right to make the loan or repurchase agreement sale may comprise, in embodiments, a fee to be calculated at least in part using a fee algorithm selected from the group of a fixed fee, a fee/per time period, a fee that varies at least in part with the length of the lending or sale before repurchase period, a fee that varies at least in part based on the number of units of the security loaned or sold, a fee that varies based at least in part on a price of a unit of the security, a fee based at least in part on a total value of the securities in the loan or sale, a fee based on a volume of loans or repo sales made over time by a given lender or borrower or seller or borrower, a relationship, a fee based at least in part on two dimensional tiering using the number of units loaned as one tier parameter, or a loan period as one tier, to name a few. In embodiments, the fee may accrue hourly, or daily, or weekly, or any other time period, or may accrue aperiodically based on another parameter.

Block 210 comprises an operation of accessing, using the one or more computers, loan data on a loan or sale in a repurchase agreement transaction of one or more units of the security. In embodiments, the loan data or sale data may comprise a number of the units of the security and/or value data for the security loaned or sold, and an identification of one or both a lender of the security and a borrower of the security or one or both of a seller and buyer in a repurchase agreement transaction of the security. In embodiments, the loan data may further comprise one or more of a length of time for the loan or repo sale, fee rate per time period, to name a few. In embodiments, the loan data or repurchase agreement sale data may comprise just the fact of a loan or repurchase agreement sale of the security, but without a number of units loaned or sold or a value of the security. In embodiments, the accessing loan data step 210 may comprise receiving notification of a loan of units of the security from a universal clearing service for the security, e.g., the DTCC. In embodiments, an operation may be performed of entering into the one or more databases and/or receiving the loan data or the repo sale data for the security.

Block 220 comprises an operation of correlating or matching or cross referencing, using the one or more computers, the loan data for the loan or the repurchase agreement (repo) sale of the security with the Transfer Fee data for the right to loan or sell in a repurchase agreement transaction the security. In embodiments where the issuer or collective investment vehicle is operating the method, and may in some embodiments also be the third party to be paid, the correlation operation may comprise simply matching the Transfer Fee for that collective investment vehicle with the loan data or repo sale data obtained for that security. In embodiments where the one or more databases comprise data on Transfer Fees for many securities, this operation may comprise determining a correct Transfer Fee from among the plurality of Transfer Fees in the one or more databases based at least in part on identifying data for the security and/or the issuer of the security from the loan data or the repo sale transaction data.

Block 230 comprises an operation of calculating or having calculated (e.g., outsourcing) and/or determining or having determined (e.g., outsourcing) an amount of Transfer Fee for the right to loan or repo sell the number of units or value of the security based at least in part on the Transfer Fee data for the respective security. In embodiments, the calculating and/or determining step may be based at least in part on a fee algorithm and the number of units of the security and/or value data for the security. In embodiments, this operation may comprise calculating the amount by multiplying an amount of Transfer Fee per period per unit by the number of units of the security loaned or repo sold, by a number of periods that have elapsed or will elapse for the loan or repo sale. In embodiments, the amount may be determined per period based at least in part on the fee Transfer Fee data per unit by the number of units of the security loaned or repo'd. In embodiments, the Transfer fee may be simply a flat fee for the loan or repo sale or a flat fee per time period for the loan or for the repo sale. In embodiments, the amount may be obtained or received from another system and/or entity. In embodiments, the Transfer Fee for an entire period of the loan or repo sale may be calculated. In embodiments, the fee may be a flat fee per time period regardless of the number of units loaned or repo'd, or the value of the security loaned or repo'd. In embodiments, the flat fee per time period may vary based on the length of the loan or repo sale, e.g., the flat fee may increase or decrease for longer loan or repo periods.

Block 240 comprises an operation of debiting or having debited or generating the data for debiting at least one account and/or generating or having generated and/or sending or having sent at least one bill, using the one or more computers, for the amount of the Transfer Fee to be paid to the third party that is not the borrower or the lender or the repurchase agreement seller or repurchase agreement buyer of the security for a right to loan or sell in a repurchase agreement transaction the number of units or value of the security. The amount debited and/or billed may be based at least in part on the calculating and/or determining step. In embodiments, a debiting operation and/or a billing operation may be performed for every period. In embodiments, the fee amount for a plurality of periods of the loan may be accumulated, and an accumulated sum may be debited and/or billed. Note that in embodiments, the type of account and the ownership of the account that is debited is not limiting on the invention. In embodiments, the account debited may be an account associated directly or indirectly with the lender or the repurchase agreement seller of the security. In embodiments, the account debited may be an account associated directly or indirectly with the borrower or repurchase agreement buyer of the security. In embodiments, one or more accounts may be debited for the lender and/or the borrower or their respective agents or designees or for the repo seller and/or repo buyer or their respective agents of designees in a universal clearing service, e.g., the DTCC, for the security.

The billing data may be maintained in one or more of the registration database, the Transfer Fee obligation database, and/or a separate billing database. In embodiments, bills may be disseminated either electronically, by mail, or both. Subsequent accounting and collection processes and updating of databases with billings, debits, and payments received may be ongoing.

Block 250 comprises an optional operation of sending or having sent or generating or having generated or making accessible electronically in a database, data on revenue to be paid to an issuer of the security based in whole or in part on the Transfer fee. In embodiments where the security is issued by a collective investment vehicle or other entity where the Transfer Fee may be accrued or is to be accrued, the optional step may be performed of generating or having generated and/or sending or having sent data on the Transfer Fee accrued or to be accrued. In some embodiments, this data may be used in calculating a net asset value (NAV) or revenues for the collective investment vehicle or other entity, with the accrued Transfer Fee to be included as a part of a value of the collective investment vehicle or other entity. In embodiments, this operation may be performed as each fee period elapses or may be accumulated and performed after multiple periods have elapsed, or may be performed on another schedule. In embodiments, an operation of accruing may be performed or instructed to be performed, by sending an instruction for the accrual operation. In embodiments operated by a collective investment vehicle, the method may further comprise calculating, using the one or more computers, a net asset value (NAV) for the collective investment vehicle, using the accrued Transfer Fees as a part of a value of the collective investment vehicle. In embodiments, the collective investment vehicle may be an exchange traded fund. In embodiments, the collective investment vehicle may be a closed end fund.

Block 260 comprises an operation of updating or providing data for updating, using the one or more computers, the one or more databases with the amount of the Transfer Fee determined and/or calculated and/or debited and/or billed. In embodiments, the one or more databases may be updated with an amount of the Transfer Fee actually received by the third party that is not the borrower or the lender or the repurchase seller or the repurchase buyer of the security for the loan or sale in a repurchase agreement transaction of the number of units of or value of the security or the fact of the loan or the fact of the repurchase agreement sale. This updating operation may be performed electronically based at least in part on computer-to-computer communications, and/or may be keyed or scanned into the one or more databases. In embodiments, the updating step may be performed on a substantially real time basis as data is received on the loan or repo of securities, and/or to reflect the debiting and/or billing operations, and/or to reflect actual payments received by an account of the third party.

Note that it is contemplated that one or more of the foregoing operations may be outsourced for performance.

As noted, in embodiments, the one or more databases may contain data for a prospectus for the security and/or a contract relating to the security, with the data for the prospectus and/or the contract including a fee algorithm or a reference to a fee algorithm.

In embodiments, the one or more databases may contain data for a contract comprising a trust agreement for the security.

In embodiments, the Transfer Fee may money.

In embodiments, the security may be an ETF unit or a closed end fund unit.

In embodiments, the security may be a bond or a share of common stock.

In embodiments, a billing step may comprise generating and sending or having sent a bill, for the amount of the Transfer Fee, based at least in part on the calculating and/or determining step.

In embodiments, an operation may be performed of generating data, using the one or more computers, for providing a Web interface or other Internet interface for receiving data on a loan or repo sale of units of the security. In embodiments, this interface data may be hosted on a Web page on a server.

In embodiments, the accessing Transfer Fee data step may comprise obtaining identification of both a borrower of the security and the lender of the security, or both a repurchase seller and a repurchase buyer in a repurchase agreement transaction. In some embodiments, an operation may be performed of allocating at least a portion of the fee amount to the lender and allocating at least a portion of the fee amount to the borrower, or allocating at least a portion of the fee amount to both the repurchase agreement seller and a portion of the fee amount to the repurchase buyer. Likewise, in embodiments, the accessing An allocation algorithm may be used to apportion the fee between the lender and the borrower, or between the repurchase seller and the repurchase buyer, based on one or more parameters, such as a length of the security loan or repo sale, a number of units of the security in the loan or repo sale, a total value of the securities loaned or repo'd, a number of loan transactions and/or repo transactions for the respective lender or repurchase seller, and/or the number of loan transactions and/or repo transactions for the borrower or repo buyer. in a given time period, a relationship with an entity such the universal clearing entity, to name just a few of the possible parameters.

In embodiments where both the lender of the securities and the borrower, or the repurchase seller and the repurchase buyer of the securities in a repurchase agreement transaction, are assessed fees, the fees actually paid by the respective lender and the respective borrower for a security, or by the respective seller and the respective buyer in a repurchase agreement transaction, may be aggregated, using the one or more computers, to determine if a full fee payment for the loan or for the particular loan period or the repo sale period has been recorded, or whether there is a shortfall, that must be made up. Alternatively, this shortfall determination may be made by comparing the amount billed to the party with the amount received from the party. In embodiments where a shortfall has been determined, a debiting of an account and/or billing to one selected from the group of the lender and the borrower, or to one selected from the group of the repurchase seller and the repurchase buyer in a repurchase agreement transaction, may be increased if the other in the group of the lender and the borrower, or the other in the group of the repurchase seller and the repurchase buyer has caused the shortfall by failing to pay the requisite fees assessed to him/her for the loan or repo sale. Thus, in embodiments, the method may further comprise an operation of assessing, using the one or more computers, a larger fee or the entire fee amount against one selected from the group of the lender and the borrower if the other in the group of the lender and borrower has not paid their respective portion of the fee amount, or to one selected from the group of the seller and the buyer if the other in the group of the seller and the buyer has not paid their respective portion of the fee amount.

In embodiments, the method may further comprise an operation of generating data, using the one or more computers, for an electronic screen display representing a lender-borrower chain indicating all or substantially all lenders and borrowers of the respective security, and/or a repurchase seller-repurchase buyer chain for a repurchase agreement transaction, indicating all or substantially all repurchase sellers and repurchase buyers of the respective security.

In embodiments, the method may further comprise an operation of generating and sending or having sent, using the one or more computers, a notification of a lender-borrower chain for the loan of the security, or a repurchase seller-repurchase buyer chain for a repurchase agreement sale of the security. In embodiments, this notification of the lender-borrower chain may be sent to the IRS.

In embodiments, the method may further comprise an operation of generating and sending or having sent, using the one or more computers, a notification of a dividend, interest or distribution paid to the owner of the security. In embodiments, this notification of the dividend, interest or distribution may be sent to the IRS.

Accordingly, in embodiments a method is disclosed requiring one or more parties to loan arrangements and/or repurchase agreement transactions for securities to register their loans or repurchase agreement transactions in a central database or a distributed one or more databases, and to pay the collective investment vehicle or other issuer or their respective designees the Transfer Fee. An entity with access to this one or more databases may bill either the lender or the borrower or both, or the repo seller or the repo buyer or both. In embodiments, this billing may be required in a collective investment vehicle's prospectus.

In embodiments where a part of the Transfer Fee is required from both the lender and the borrower, or from both the repurchase seller and the repurchase buyer of the security in a repurchase agreement transaction, a matching operation may be performed of the lender registration to the borrower registration, or the repurchase seller registration to the repurchase buyer registration, thereby increasing confidence in fee payment compliance. In some embodiments of such an operation, the method may further comprise receiving or obtaining a registration of a loan of a security from one selected from thee group of the lender of the security and the borrower of the security, or obtaining a registration of a sale of a security from one selected from the group of the repurchase seller of the security and the repurchase buyer of the security in a repurchase agreement sale; determining, using the one or more computers, if there is matching registration of the loan from the other in the group of the lender and the borrower, or from the other in the group of the repurchase seller and the repurchase buyer in a repurchase agreement sale; and entering or having entered data, using the one or more computers, indicating matching registrations for the loan or repurchase agreement sale, or indicating a failure to determine matching registrations for the loan or repurchase agreement sale. The failure to obtain a match may be used to trigger, using the one or more computers, or by manual keying in the system, an assessment of part or all of any fee shortfall to the registering party, and/or to the non-registering party, and/or penalties and/or interest against the party not providing the registration of the loan.

In embodiments, the calculating and/or determining the amount of the Transfer Fee may comprise allocating at least a portion of the fee amount to each of the lender and the borrower, or to each of the repurchase seller and the repurchase buyer in a repurchase agreement sale. In some embodiments, fees paid by the respective lender and the respective borrower, or the respective repurchase seller and the respective repurchase buyer in a repurchase agreement sale, for a security may be aggregated to determine if there is a full fee payment for the loan, or whether there is a shortfall, that must be made up. In such embodiments, a step may then be performed of assessing, using the one or more computers, all or a portion of the shortfall in the entire fee amount against one selected from the group of the lender and the borrower, if the other selected from the group of the lender and borrower has not paid their respective portion of the fee amount, or against one selected from the group of the repurchase seller and the repurchase buyer in a repurchase agreement sale, if the other of the repurchase seller and repurchase buyer has not paid their respective portion of the fee amount. An operation would then be performed of debiting an account and/or billing to one of the lender or borrower parties, or to one of the repurchase seller and the repurchase buyer in the repurchase agreement sale, an increased amount comprising all or a portion of the shortfall if the other of the parties has failed to pay their portion of the fees for the loan or the repurchase agreement sale of the security.

In embodiments where there has been a shortfall in fee payments, method steps may be performed of determining, using the one or more computers, interest and/or a penalty on one or both of the parties for any shortfall or late payment of the fees for the loan or the repurchase agreement sale, and debiting an account and/or billing to the one or both of the lender and the borrower, or to one or both of the repurchase seller or the repurchase buyer for a repurchase agreement sale, for any shortfall or late payment of the fees for the loan or for a repurchase agreement sale.

In embodiments, the governing agreement for an issuer may include or be modified to include a registration requirement for the lender and/or a borrower and/or the repurchase seller and/or the repurchase buyer in a repurchase agreement sale, of the security. Such governing agreements may be a prospectus, a trust agreement, by-laws, and any other document binding the borrower or lender and/or the seller and/or the buyer in a repurchase agreement sale to pay the fees. The broker dealer community may be notified of this requirement. In embodiments, the method may further comprise writing, using the one or more computers, an amendment to an electronic copy of a prospectus in a prospectus database to add language on the required Transfer Fee to be paid to the third party for a right to loan or perform a repurchase agreement sale of one or more units of the security.

Embodiments of a system and method may operate on a standalone basis and/or as part of a universal clearing service and/or as part of a financial entity. In embodiments, one or more data items for one or more of the databases may comprise short interest, identities of the borrower, the lender, the seller in a repurchase agreement sale, the buyer in a repurchase agreement sale, agents, contract specifications, method of Transfer Fee accrual, current accrued Transfer Fees, confidentiality issues such a security roles and access, to name a few.

Embodiments disclosed may serve the purpose of preventing parties from free-riding on collective investment vehicles or other issuers and obtaining exposure to notional value of the collective investment vehicle units or other units without paying requisite management fees. This free-riding is inequitable both to the collective investment vehicle sponsor or other issuers who are deprived of its fee and to the other owners of the collective investment vehicle units who are deprived of the extra income that could be used to their collective benefit by the sponsor.

FIG. 3 is a block diagram illustrating an embodiment of a computer system that may be used for implementations, generally designated by reference number 300 in FIG. 3. In embodiments, the system 300 may be communicatively coupled to one or more networks 305 via a communication interface 395. The one or more networks 305 may represent a generic network, which may correspond to a local area network (LAN), a wireless LAN, an Ethernet LAN, a token ring LAN, a wide area network (WAN), the Internet, a proprietary network, an intranet, a telephone network, a wireless network, to name a few, and any combination thereof. Depending on the nature of the network employed for a particular application, the communication interface 395 may be implemented accordingly. The network 305 serves the purpose of delivering information between connected parties. Note that the computing and/or storage of data may be remote, e.g., so-called cloud computing and/or storage.

The system 300 may comprise, in embodiments, a computing platform for performing, controlling, and/or initiating computer-implemented operations, for example, via a server and the one or more networks 305. The computer platform may comprise system computers and other party computers. The system 300 may be include, one or more personal computers, workstations, notebook computers, servers, mobile computing devices, handheld devices, multi-processor systems, networked personal computers, minicomputers, mainframe computers, personal data assistants, Internet appliances (e.g., a computer with minimal memory, disk storage and processing power designed to connect to a network, especially the Internet, etc.), or controllers, to name a few. The system 300 may operate under the control of computer-executable instructions to carry out the process steps described herein. Computer-executable instructions comprise, for example, instructions and data which cause a general or special purpose computer system or processing device to perform a certain function or group of functions. Computer software for the system 300 may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

The system 300 may comprise, in embodiments, a bus 310 or other communication component that couples the various system elements 320-395, and is configured to communicate information between the various system elements 320-395.

As shown in FIG. 3, the one or more computers may comprise one or more computer processors 320 coupled with the bus 310 and configured to process and handle information and execute instructions. The system 300 may include a main memory 350, such as a Random Access Memory (RAM) or other dynamic storage device, coupled to the bus 300, for storing information and instructions to be executed by the one or more processors 320. The main memory 350 also may be used for storing temporary variables or other intermediate information during execution of instructions by the one or more processors 320.

The system 300 further may include a Read-Only Memory (ROM) 330 or other static storage device (e.g., EPROM, EAROM, EEPROM, PROM, flash, and the like) coupled to the bus 310 for storing static information and instructions for the one or more processors 320. Furthermore, a storage device 340, such as a magnetic disk or optical disk, such as a CD-ROM or other optical media may be provided and coupled to the bus 310 for storing information and instructions.

In addition to the ROM 330, one or more databases 360 may be coupled to the bus 310 for storing static information and software instructions. Information stored in or maintained in the database 360 may be provided in conformance with a database system format such as, but not limited to, the Structured Query Language (SQL) format. Database query and access instructions, for example, in the form of one or more scripts, may be used which, when executed by a processor such as the processor 320, serve to access, store and retrieve data maintained in the database 360 according to the instructions contained in the script.

Furthermore, the system 300 may comprise application software instructions which may implement a user interface portion for generating interactive pages or display screens by which a user may provide data to and receive information from the system 300 and the database 360 using a human-machine interface. Interactive pages may include user dialog boxes for accepting user entered information. In particular, the human-machine interface may comprise a Graphical User Interface (GUI) portion for prompting the user to enter data by providing an interactive dialog box or message box instructing the user to enter particular data, or to select from among a multitude of options provided using a pull-down menu. A user may interact with the system 300 via the graphical user interface by using a pointing device and/or data entry device. The GUI portion may place the output of the system 300 in a format for presentation to a system user via the display. In at least one embodiment, the GUI may be implemented as a sequence of Java instructions.

A data entry device 370, including alphanumeric and other keys, or a pointing device such as a mouse or trackball, or a scanner, to name a few, may be coupled to the bus 310 for communicating information and command selections to the processor 320. The data entry device 370 may be coupled to the bus 310 via an interface (not shown), wherein the interface may be, for example, a serial port, an RS-232 port, or the like. In addition, the interface may be a wireless interface and provide connection-less communication via, for example, Bluetooth communication.

The system 300 may be coupled via the bus 310 to a display or printer 390 for outputting information to a system user. In addition, a system user may use the display (e.g., touch screen) or printer (e.g., scanner) to provide information to the system 300.

In embodiments, the various program operations as described herein may be provided by the system 300 in response to the one or more processors 320 executing one or more sequences of computer-readable instructions contained in the main memory 350. Such instructions may be read into the main memory 350 from another computer-readable medium, such as the ROM 330, the storage device 340, or the database 360. Execution of the sequences of instructions contained in the main memory 350 may cause the one or more processors 320 to perform the process steps described herein. It should be appreciated that an embodiment of the system 300 may perform fewer or additional processes as compared to those described herein. As noted, the one or more processors 320 may be arranged in a multi-processing arrangement. Alternatively, hard-wired circuitry may be used in place of or in combination with software instructions to implement the invention. Thus, embodiments of the invention are not limited to any specific combination of hardware circuitry and software.

Embodiments include program products comprising machine-readable media with machine-executable instructions or data structures stored thereon. Such machine-readable media can be any available storage media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other storage medium which can be used to store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

As noted, embodiments of the present invention may be practiced with one or multiple computers in a networked environment using logical connections to one or more remote computers (including mobile devices) having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

As previously noted, the system 300 also comprises a communication interface 395 coupled to the bus 310 for providing one-way, two-way or multi-way data communication with the network 305, or directly with other devices. In embodiments, the communication interface 395 may comprise a modem, a transceiver Integrated Services Digital Network (ISDN) card, a WAN card, an Ethernet interface, or the like, to provide a data communication connection to a corresponding type of communication medium. As another example, the communication interface 395 may comprise a LAN card to provide a data communication connection to a compatible LAN. Wireless links may also be implemented. In such wireless links, communication interface 395 may communicate with a base station communicatively coupled to a network server. In any such implementation, the communication interface 395 sends and receives electrical, electromagnetic, radio, infrared, laser, or optical signals that carry digital data streams representing various types of information. Any combination of the above interfaces may also be implemented.

In embodiments, the communication interface 395 may be communicatively coupled to a web server configured to generate and output web content that is suitable for display using a web browser at a computing device. In embodiments, the server may generate and transmit requested information through the communication interface 395 to a requesting terminal via Hypertext Transfer Markup Language (HTML) formatted pages, eXtensible Markup Language (XML) formatted pages, or the like, which may be provided as World Wide Web pages that may enable navigation by hyperlinks. The server program may be used to receive commands and data from the clients' terminals, access and process data from various sources, and output computer-executable instructions and data using the network 305.

The web server, in embodiments, may correspond to a secure web application server operating behind a web server program that a service provider employs to run one or more web based application programs to carry out the methods described above in a secure fashion. Such a secure web application server may be configured to execute one or more web based application programs, respond to commands and data received from the clients (via a web page supported by the web server), and provide data and results to the clients. The web server and the web application server may be implemented using a single computing platform. Alternatively, it may be implemented using multiple separate and distributed computing platforms.

Referring to FIG. 4, the one or more computers of the system may, in embodiments, be configured with the illustrated components and/or modules stored separately or in combination. In the embodiment shown in FIG. 4, the one or more computers are configured, with data access and update program code 420 for accessing data and for updating the one or more databases. FIG. 4 further comprises correlating program code 430 for correlating/matching loan data on a loan of a security, or repo data for a repurchase agreement transaction of a security, with the Transfer Fee data to be paid to the third party for the right to loan or repo that security. FIG. 4 further comprises Transfer Fee calculation program code 440 for calculating or determining an amount of Transfer Fee for the right to loan or repo the number of units in the loan or repo data or the value of the security loaned or repo'd, and/or just the fact of the loan or repurchase agreement sale. FIG. 4 further comprises debiting/billing program code 450 for debiting and/or billing the amount of the Transfer Fee that was determined. FIG. 4 further comprises accrual program code 460 for generating or having generated or sending or having sent data on the Transfer Fee accrued or to be accrued. Various other program code may also be included such as a reports program module, to name a few.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the." When it is stated that one of A and B, it means that one is selected from the group of A and B.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments disclosed herein to form an embodiment with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

We claim:

1. A method, comprising:
    accessing, by one or more computers, Transfer Fee data held in one or more databases on a required Transfer Fee to be paid to a third party that is not a borrower or an owner/lender or a repurchase seller or repurchase buyer of a security for a right to loan in a loan transaction or to sell in a repurchase agreement transaction one or more units of the security, wherein the security comprises one or more selected from the group of an exchange traded product unit, a bond, a common stock, and a closed end collective investment vehicle unit;
    accessing, by the one or more computers, data on a loan in a loan transaction, or a sale in a repurchase agreement transaction, of one or more units of the security, the data comprising the number of the units of the security and/or value data for the security loaned in a loan transaction or sold in a repurchase agreement transaction, and an identification of one or more of an owner/lender or a borrower or a repurchase agreement seller or a repurchase agreement buyer of the security;
    correlating, by the one or more computers, the data for the loan or the sale of the security with the Transfer Fee data for the right to loan or sell the security;
    calculating or having calculated and/or determining or having determined, by the one or more computers, an amount of a Transfer Fee for the right to loan or sell the number of units or value of the security based at least in part on the Transfer Fee data for the respective security;
    debiting or having debited and/or generating data for debiting at least one account and/or generating or having generated and/or sending or having sent at least one bill, by the one or more computers, for the amount of the Transfer Fee to be paid to the third party that is not the borrower or the owner/lender or the repurchase agreement seller or the repurchase agreement buyer of the security for a right to loan in a loan transaction, or sell in a repurchase agreement transaction, the number of units or value of the security, based at least in part on the calculating and/or determining step;
    sending or having sent or generating or having generated or making accessible electronically to an issuer of the security, data on an amount of revenue from one or more of the Transfer Fees to be paid for the security issued by a collective investment vehicle or other entity where the Transfer Fee may be accrued or is to be accrued;
    wherein the Transfer Fee is based at least in part on a fee algorithm comprising an amount per time period,
    wherein the sending or having sent or generating or having generated data step further comprises accruing the amount of the Transfer Fee for the right to loan in a loan transaction or sell in a repurchase agreement transaction the number of units or value of the security of the collective investment vehicle as the time periods elapse,
    updating or having updated, by the one or more computers, the one or more databases periodically or on an ad hoc basis to obtain a current accrued amount of the Transfer Fee for the loan in a loan transaction or sale in a repurchase agreement transaction of the number of units or value of the security for use in calculating a net asset value (NAV) for the collective investment vehicle, and
    wherein the one or more databases contain information pertaining to terms related to calculation of the Transfer Fee as described in a trust agreement and/or prospectus for the security.

2. The method as defined in claim 1, wherein the Transfer Fee is cash.

3. The method as defined in claim 1, wherein the security was issued by an ETF collective investment vehicle and is an exchange traded fund unit.

4. The method as defined in claim 1, wherein the security is a bond.

5. The method as defined in claim 1, wherein the security is a common stock.

6. The method as defined in claim 1, wherein the security is a closed end collective investment vehicle unit.

7. The method as defined in claim 1, wherein the Transfer Fee comprises a fee to be calculated at least in part using a fee algorithm selected from the group of a fee that varies at least in part on the number of units of the security loaned or sold in the repurchase agreement transaction, a fee that varies at least in part based on a price of a unit of the security, and a fee based on two dimensional tiering using the number of units loaned or sold in the repurchase agreement transaction as one tier parameter and time as another parameter.

8. The method as defined in claim 1, wherein the updating step is performed on a substantially real time basis as data is received on the loan in a loan transaction or sale in the repurchase agreement transaction of the security.

9. The method as defined in claim 1, comprising the debiting of an account associated directly or indirectly with the owner/lender of the security, or associated directly or indirectly with the seller of the security in a repurchase agreement transaction, based at least in part on the calculating and/or determining step.

10. The method as defined in claim 9, wherein the account is held by the owner/lender, or the seller in a repurchase agreement transaction, in a universal clearing service for the security.

11. The method as defined in claim 1, comprising generating and sending or having sent a bill, for the amount of the Transfer Fee, based at least in part on the calculating and/or determining step.

12. The method as defined in claim 1, further comprising generating data, by the one or more computers, for providing a Web interface for receiving data on a loan or sale in a repurchase agreement transaction of units of the security.

13. The method as defined in claim 1, wherein the receiving data step comprises receiving notification of a loan or sale in a repurchase agreement transaction of units of the security from a universal clearing service for the security.

14. The method as defined in claim 1, wherein the accessing Transfer Fee data step comprises obtaining identification of both the owner/lender of a security and the borrower of the security in a loan transaction, or identification of both the seller of the security and the buyer of the security in a repurchase agreement transaction.

15. The method as defined in claim 14, wherein the calculating and/or determining the amount of the Transfer Fee comprises allocating at least a portion of the fee amount, to each of the owner/lender and the borrower in a loan transaction, or to each of the repurchase seller of the security and the repurchase buyer of the security in a repurchase agreement transaction.

16. The method as defined in claim 15, further comprising:
aggregating fees, by the one or more computers, paid by the owner/lender and/or the borrower, or paid by the repurchase seller of the security and/or the repurchase buyer, to determine if there is a full fee payment of the Transfer Fee for the loan or repurchase agreement sale, or whether there is a shortfall;
assessing, by the one or more computers, all or a portion of the shortfall in the entire Transfer Fee amount against one selected from the group of the owner/lender and the borrower if the other selected from the group of the owner/lender and borrower has not paid their respective portion of the fee amount, or against one selected from the group of the repurchase seller and the repurchase buyer if the other selected from the group of the repurchase seller and repurchase buyer in a repurchase agreement sale, has not paid their respective portion of the fee amount; and
debiting an account and or billing to one selected from the group of the owner/lender and the borrower, or to one selected from the group of the repurchase seller and the repurchase buyer in a repurchase agreement sale, an increased amount comprising all or a portion of the shortfall if the other selected from the group of the owner/lender and the borrower for the loan, or the other selected from the group of the repurchase seller and the repurchase buyer in a repurchase agreement sale, has failed to pay their portion of the fees.

17. The method as defined in claim 15, further comprising:
determining, by the one or more computers, interest and/or a penalty on one or both of the owner/lender or the borrower for a loan, or one or both of the repurchase seller or the repurchase buyer in a repurchase agreement sale for any late payment of the Transfer Fee; and
debiting an account or billing to one or both of the owner/lender or the borrower for a loan, or to one or both of the repurchase seller or the repurchase buyer in a repurchase agreement sale, for any late payment of the Transfer Fees.

18. The method as defined in claim 1,
wherein the accessing Transfer Fee data step comprises obtaining a registration of a loan of a security from one selected from the group of the owner/lender of the security and the borrower of the security, or obtaining a registration of a sale of a security from one selected from the group of the repurchase seller of the security and the repurchase buyer of the security in a repurchase agreement sale, and
further comprising:
determining, by the one or more computers, if there is a matching registration of the loan from the other selected from the group of the owner/lender and the borrower, or if there is matching registration of the repurchase agreement sale from the other selected from the group of the repurchase seller and the repurchase buyer; and
entering or having entered, by the one or more computers, data indicating matching registrations for the loan or repurchase agreement sale, or a failure to determine matching registrations for the loan or repurchase agreement sale.

19. The method as defined in claim 1, further comprising generating data, by the one or more computers, for an electronic screen display representing a lender-borrower chain, and/or a repurchase seller-repurchase buyer chain for a repurchase agreement sale.

20. The method as defined in claim 1, further comprising:
writing, using the one or more computers, an amendment to a prospectus in a prospectus database to add language on the required Transfer Fee to be paid to the third party for a right to loan or sell in a repurchase agreement sale one or more units of the security.

21. The method as defined in claim 1, further comprising:
generating and sending or having sent, by the one or more computers, a notification of a lender-borrower chain for the loan of the security, or a notification of a repurchase seller-repurchase buyer chain for a repurchase agreement sale.

22. The method as defined in claim 1, further comprising:
generating and sending or having sent, by the one or more computers, a notification of a dividend, interest or distribution associated with an owner of the security.

23. The method as defined in claim 1, further comprising:
calculating or having calculated, by the one or more computers, a net asset value (NAV) for the collective investment vehicle, using the accrued Transfer Fees as a part of a value of the collective investment vehicle.

24. The method as defined in claim 23, wherein the collective investment vehicle is an exchange traded fund.

25. The method as defined in claim 23, wherein the collective investment vehicle is a closed end fund.

26. A system, comprising:
one or more computers, configured to perform the following steps:
- accessing, by the one or more computers, Transfer Fee data held in one or more databases on a required Transfer Fee to be paid to a third party that is not a borrower or an owner/lender or a repurchase seller or repurchase buyer of a security for a right to loan in a loan transaction or to sell in a repurchase agreement transaction one or more units of the security, wherein the security comprises one or more selected from the group of an exchange traded product unit, a bond, a common stock, and a closed end collective investment vehicle unit;
- accessing, by the one or more computers, data on a loan in a loan transaction, or a sale in a repurchase agreement transaction, of one or more units of the security, the data comprising the number of the units of the security and/or value data for the security loaned in a loan transaction or sold in a repurchase agreement transaction, and an identification of one or more of an owner/lender or a borrower or a repurchase agreement seller or a repurchase agreement buyer of the security;
- correlating, the one or more computers, the data for the loan or the sale of the security with the Transfer Fee data for the right to loan or sell the security;
- calculating or having calculated and/or determining or having determined, the one or more computers, an amount of a Transfer Fee for the right to loan or sell the number of units or value of the security based at least in part on the Transfer Fee data for the respective security;
- debiting or having debited and/or generating data for debiting at least one account and/or generating or having generated and/or sending or having sent at least one bill, by using the one or more computers, for the amount of the Transfer Fee to be paid to the third party that is not the borrower or the owner/lender or the repurchase agreement seller or the repurchase agreement buyer of the security for a right to loan in a loan transaction, or sell in a repurchase agreement transaction, the number of units or value of the security, based at least in part on the calculating and/or determining step;
- sending or having sent or generating or having generated or making accessible electronically to an issuer of the security, data on an amount of revenue from one or more of the Transfer Fees to be paid if for the security is-issued by a collective investment vehicle or other entity where the Transfer Fee may be accrued or is to be accrued;
- wherein the Transfer Fee is based at least in part on a fee algorithm comprising an amount per time period,
- wherein the sending or having sent or generating or having generated data step further comprises accruing the amount of the Transfer Fee for the right to loan in a loan transaction or sell in a repurchase agreement transaction the number of units or value of the security of the collective investment vehicle as the time periods elapse,
- updating or having updated, by the one or more computers, the one or more databases periodically or on an ad hoc basis to obtain a current accrued amount of the Transfer Fee for the loan in a loan transaction or sale in a repurchase agreement transaction of the number of units or value of the security for use in calculating a net asset value (NAV) for the collective investment vehicle, and
- wherein the one or more databases contain information pertaining to terms related to calculation of the Transfer Fee as described in a trust agreement and/or prospectus for the security.

* * * * *